United States Patent
Rabbitt et al.

(10) Patent No.: US 10,108,971 B2
(45) Date of Patent: Oct. 23, 2018

(54) SYSTEMS AND METHODS FOR CUSTOMIZING AN ADVERTISEMENT

(75) Inventors: Michael Rabbitt, Brooklyn, NY (US); Olumide Adebayo, Bridgeport, CT (US); Kiran Thomas, Staten Island, NY (US); James Yu, New York, NY (US); Andy Peter Schön, New York, NY (US); Jonathan Levine, New York, NY (US)

(73) Assignee: RAKUTEN MARKETING LLC, New York, NY (US)

( * ) Notice: Subject to any disclaimer, the term of this patent is extended or adjusted under 35 U.S.C. 154(b) by 1130 days.

(21) Appl. No.: 12/412,320

(22) Filed: Mar. 26, 2009

(65) Prior Publication Data

US 2009/0307081 A1 Dec. 10, 2009

Related U.S. Application Data

(60) Provisional application No. 61/039,668, filed on Mar. 26, 2008.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0243* (2013.01); *G06Q 30/0251* (2013.01); *G06Q 30/0255* (2013.01)

(58) Field of Classification Search
USPC .......... 705/14.4, 14.42, 14.49, 14.53, 14.52, 705/14.73
See application file for complete search history.

(56) References Cited

U.S. PATENT DOCUMENTS 6,141,666 A 10/2000 Tobin
7,478,089 B2 * 1/2009 Henkin et al.
(Continued)

FOREIGN PATENT DOCUMENTS

JP 2004038370 A 5/2004
JP 2004192484 A 8/2004

OTHER PUBLICATIONS

Int'l Search Report; PCT/US/2009/038462; dated May 13, 2009.

*Primary Examiner* — Luis A Brown
(74) *Attorney, Agent, or Firm* — Troutman Sanders LLP

(57) ABSTRACT

The disclosed technology provides systems, architectures, and methods for providing to a Web page electronic advertisements related to the content of the Web page. In one aspect, the disclosed technology manages and serves electronic advertisements for affiliated Web page publishers and advertisers. A computer-implemented method in accordance with the disclosed technology receives a request for an electronic advertisement for a Web page, wherein the Web page is associated with a Web page publisher, accesses one or more keywords appearing in the Web page, identifies one or more relevant electronic advertisements related to the keyword(s), wherein the relevant electronic advertisement(s) are associated with an advertiser affiliated with the Web page publisher, and communicates one or more the relevant electronic advertisements to the Web page for display. The disclosed technology also includes a computer executing software, wherein the executed software causes the computer to perform the steps above.

17 Claims, 11 Drawing Sheets

(56) References Cited

U.S. PATENT DOCUMENTS

| | | | |
|---|---|---|---|
| 7,505,913 B2 | 3/2009 | Tobin | |
| 2003/0046161 A1* | 3/2003 | Kamangar et al. | 705/14 |
| 2004/0093327 A1* | 5/2004 | Anderson | G06Q 30/02 |
| 2005/0021397 A1* | 1/2005 | Cui et al. | 705/14 |
| 2005/0091106 A1* | 4/2005 | Reller et al. | 705/14 |
| 2005/0180549 A1* | 8/2005 | Chiu | H04M 3/4938 |
| | | | 379/88.16 |
| 2006/0253437 A1* | 11/2006 | Fain et al. | 707/5 |
| 2007/0130012 A1* | 6/2007 | Yruski et al. | 705/14 |
| 2007/0150342 A1* | 6/2007 | Law et al. | 705/14 |
| 2007/0214045 A1 | 9/2007 | Subramanian et al. | |
| 2007/0260736 A1* | 11/2007 | Miller | 709/227 |
| 2008/0046315 A1 | 2/2008 | Axe et al. | |
| 2008/0103887 A1* | 5/2008 | Oldham et al. | 705/14 |
| 2009/0254433 A1* | 10/2009 | Cao | G06Q 30/02 |
| | | | 705/14.45 |
| 2010/0145762 A1* | 6/2010 | Coladonato | G06Q 30/0241 |
| | | | 705/14.4 |

\* cited by examiner

SYSTEMS AND METHODS FOR CUSTOMIZING AN ADVERTISEMENT

CROSS-REFERENCE TO RELATED APPLICATIONS

This application claims the benefit of priority of U.S. Provisional Patent Application No. 61/039,668, filed Mar. 26, 2008, the entire contents of which are hereby incorporated herein by reference.

FIELD OF THE INVENTION

The present invention relates generally to electronic advertisements, and more specifically, to systems, architectures, and methods for providing to a web page one or more electronic advertisements that relate to the content of the web page.

BACKGROUND OF THE INVENTION

As the Internet and World Wide Web continue to expand, and as increasing numbers of households and businesses join the online marketplace, opportunities for merchants and consumers to reach each other will continue to increase. The environment of electronic commerce involves challenges and advantages different from those of a physical marketplace. This is especially true in the area of advertising. Electronic advertising in the Internet marketplace is vastly different from paper advertisements in the physical marketplace in many ways. One significant difference is that electronic commerce is not bounded by physical proximity; once there is access to the Internet, there is also access to the entire Internet marketplace. Thus, the audience for electronic advertising can potentially be the entire online population. Another difference is that participants in electronic commerce have the ability to electronically gather various types of information without marketplace or consumer surveys. Thus, certain manpower costs and delay associated with advertising in the physical marketplace are reduced or non-existent in the electronic marketplace.

On the other hand, the differences of the Internet marketplace also present challenges for electronic advertising. Electronic advertising involves technological competence and equipment that interested market participants may not possess. Accordingly, there is continued interest in further developing and improving various aspects of electronic advertising and of the Internet marketplace to address these and other challenges.

SUMMARY OF THE INVENTION

The disclosed technology provides systems, architectures, and methods for providing to a Web page one or more electronic advertisements related to the content of the Web page. In one aspect of the disclosed technology, the disclosed technology manages and serves electronic advertisements for affiliated Web page publishers and advertisers. A computer-implemented method in accordance with the disclosed technology receives a request for an electronic advertisement for a Web page, wherein the Web page is associated with a Web page publisher, accesses one or more keywords appearing in the Web page, identifies one or more relevant electronic advertisements related to the keyword(s), wherein the relevant electronic advertisement(s) are associated with an advertiser affiliated with the Web page publisher, and communicates one or more the relevant electronic advertisements to the Web page for display. The disclosed technology also includes a computer executing software, wherein the executed software causes the computer to perform the steps above.

Other features and advantages of the invention will become more apparent when considered in connection with the accompanying drawings and detailed description.

DETAILED DESCRIPTION

The disclosed technology provides systems, architectures, and methods for providing to a Web page one or more electronic advertisements that relate to the content of the web page. Various aspects of the disclosed technology also relate to tracking of electronic advertisement "impressions," that is, displays of an electronic advertisement. The particular embodiments described herein are exemplary and do not limit the scope of the disclosed technology.

Figure 1:
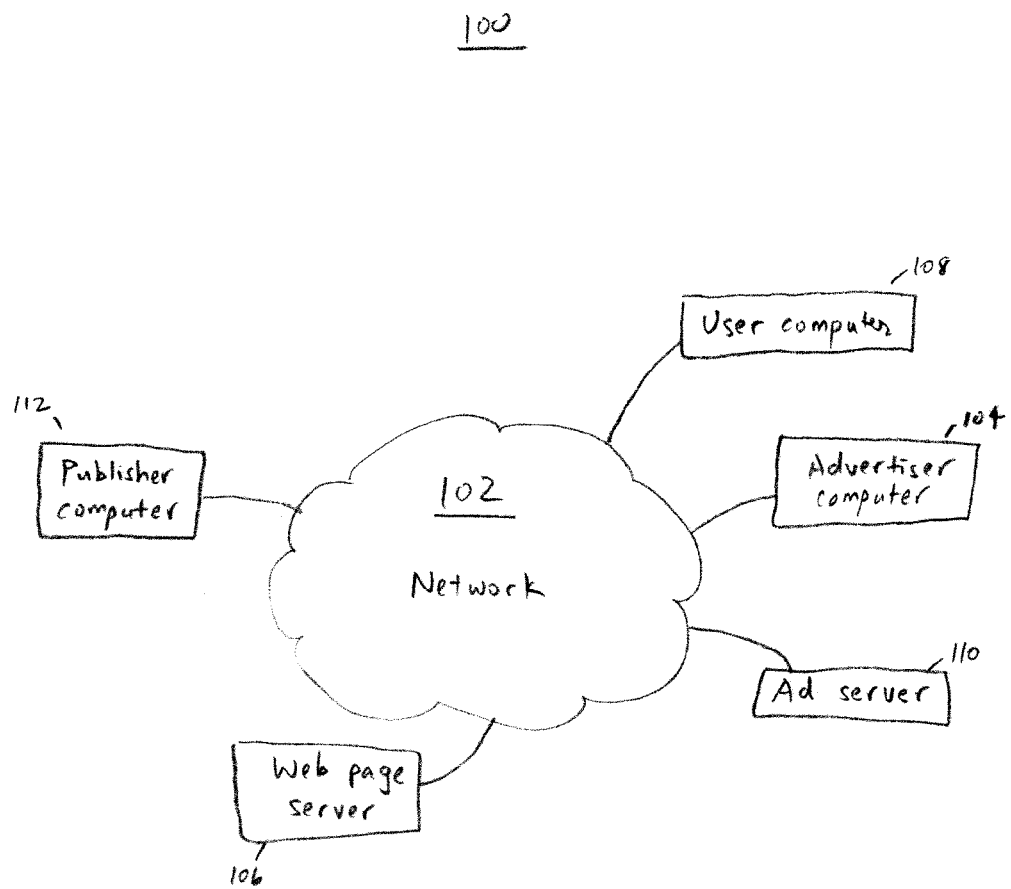
FIG. 1 is a block diagram illustrating an exemplary Internet marketplace, its participants, and associated equipment, in accordance with one embodiment of the disclosed technology.

Referring now to FIG. 1, there is shown a block diagram of one embodiment of an Internet marketplace infrastructure 100 in accordance with the disclosed technology. The Internet marketplace infrastructure 100 includes a network 102 that may include one or more telecommunication devices such as routers, hubs, gateways, and the like, as well as one or more connections such as wired connections or wireless connections. In different embodiments, the network 102 can include different numbers of telecommunication devices and connections and can span a range of different geographies. In different embodiments, the network 102 can include, among other things, all or portions of a wired telephone infrastructure, a cellular telephone infrastructure, a cable television infrastructure, and/or a satellite television infrastructure.

Various Internet marketplace participants are in communication with the network 102, including one or more Web page servers 106 and user computers 108. As used herein, the term "computer" includes any system or device that can execute machine instructions, including, for example, desktops, laptops, servers, handheld devices, television set top boxes, and/or networked computing systems, or multiples or combinations thereof. The Web page server 106 includes Web pages and Web server software that can provide the Web pages to systems or devices requesting them. The Web pages can include a myriad of different media and content, including, for example, a search interface, shopping content, news content, video or audio content, and/or animations, among others.

In accordance with one aspect of the disclosed technology, and with continuing reference to FIG. 1, the Internet marketplace infrastructure 100 also includes an electronic advertisement server ("ad server") 110, an advertiser computer 104, and a publisher computer 112 that are in communication with the network 102. As used herein, an "advertiser" is a person or entity that places electronic advertisements. A "publisher" is a person or entity that sets up Web pages on the Internet. An advertiser computer is a computer used by an advertiser, and a publisher computer is a computer used by a publisher. As used herein, advertisers and publishers that have an advertising relationship, or formerly had such a relationship, are referred to as "affiliates."

The Web page server 106, user computer 108, ad server 110, advertiser computer 104, and publisher computer 112 can each include hardware such as network communication devices, storage medium/devices, processors, memory, computer boards, optical or magnetic drives, and/or human interface devices, and software such as operating system software, Web server software, Web browsing software, database management software, software supporting various communication protocols, and/or software supporting various programming languages. In one embodiment, the user computer 108 includes a Web browser that can request Web pages from the Web page server 106. Those skilled in the art will understand that a Web browser is software that is located on a computer. As used herein, the term "computer" can include any system or device that can execute machine instructions, including, for example, desktops, laptops, servers, handheld devices, television set top boxes, and/or networked computing systems, or multiples or combinations thereof. Additionally, those skilled in the art will understand that a "Web page" refers to a collection of different things, including, for example, visual content displayed on a screen (e.g., text, picture, video, buttons, etc.), software code causing the visual content to be displayed, as well as other software code that do not cause anything to be displayed but perform certain functionality in connection with the Web page.

In the Internet marketplace infrastructure 100 of FIG. 1, users at their computers 108 may access Web pages in the Web page server 106 but, for any number of reasons, may not visit other Web pages in other Web page servers (not shown). This may be because users may not know that the other Web pages exist and/or may not be aware of electronic commerce opportunities at these other Web pages. In order to introduce potential consumers to these other Web pages, electronic advertisements may be placed in the Web pages of the Web page server 106 to inform users about other Web pages and/or their merchandise. The electronic advertisements can include different types of advertisements, including banner ads or pop-up ads, and can include different types of content, such as text, images, graphics, video, audio, animation, and/or combinations thereof.

Figure 2:
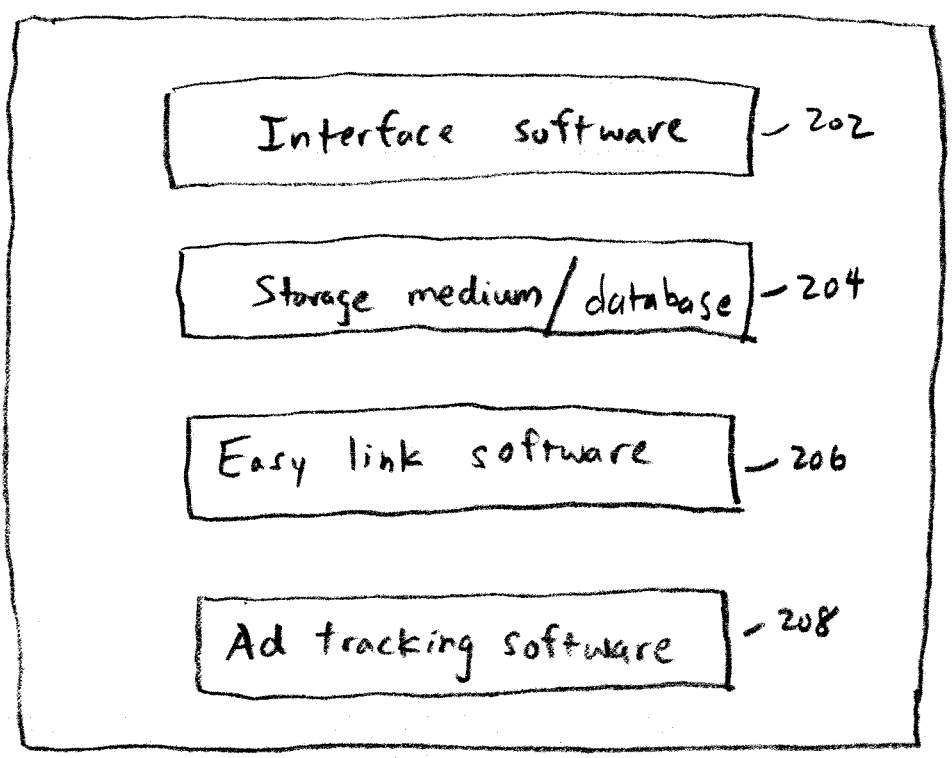
FIG. 2 is a block diagram of exemplary components in the ad server of FIG. 1.

In accordance with one aspect of the disclosed technology, electronic advertisements for display in Web pages can be stored in and managed by the ad server 110. Referring also to FIG. 2, there is shown a block diagram of exemplary components in the ad server 110 of FIG. 1. In the illustrated embodiment, the ad server includes interface software 202 that communicates with one or more publisher computers and advertiser computers, a storage medium/database 204 that stores electronic advertisements and information about advertisers and Web page publishers, easy link software 206 that serves electronic advertisements to computers requesting advertisements, and ad tracking software 208 that tracks ad impressions. Each of these components will be described in turn.

The interface software 202 in the ad server handles communications with one or more publisher computers and advertiser computers. In one embodiment, the ad server includes Web server software that allows advertiser computers and publisher computers to connect to the ad server using a Web browser. In one embodiment, the ad server and the publisher and advertiser computers can communicate using software specifically designed for their communication, rather than using a Web browser.

In one aspect of the disclosed technology, an advertiser computer can communicate with the ad server to manage its advertiser-publisher affiliate relationships and to manage its electronic advertisements. In one embodiment, the ad server can maintain an advertiser profile for each advertiser communicating with it. The advertiser profile can include, for example, an advertiser's contact information and financial account information. In one embodiment, the ad server can offer different tiers of advertisement services, and the advertiser profile can specify which services are enabled or disabled for the advertiser. One service, which will be described later herein in detail, will be referred to as "easy link." Using easy link, the ad server provides particular electronic advertisements to a Web page based on the content of the Web page. For example, if a Web page describes pet health, then relevant advertisements related to pet health can be provided for display in the Web page, such as advertisements for pet stores or advertisements for pet products. An advertiser profile can indicate whether easy link is enabled or disabled for the advertiser.

In one aspect of the disclosed technology, an advertiser computer can communicate electronic advertisements to the ad server to be stored therein. As mentioned above herein, electronic advertisements can include different types of advertisements, including banner ads or pop-up ads, and can include different types of content, such as text, images, graphics, video, audio, animation, and/or combinations thereof. In one example, an electronic advertisement can display a product image and a product price, and can include a selectable link to a merchant Web page where the advertised product can be purchased. In one aspect of the disclosed technology, an advertiser computer can communicate to the ad server descriptor words associated with an electronic advertisement. For example, if an electronic advertisement shows a pet vitamin, descriptors associated with the advertisement can include words such as pet, cat, dog, nutrition, healthy, supplement, and vitamin, among others. The descriptors can be useful for many different types of operations, such as categorizing of advertisements. For easy link, descriptors can be used by a search tool to identify electronic advertisements that relate to the content of a Web page.

In one aspect of the disclosed technology, an advertiser computer can communicate with the ad server to manage its advertiser-publisher affiliate relationships. For example, the advertiser can maintain a list of publishers that have an affiliate relationship with the advertiser. An advertiser computer can communicate with the ad server to update and maintain this list. In one embodiment, the advertiser can also maintain a list of easy link approved publisher affiliates, so that an advertiser's electronic advertisements are served only to publishers on the advertiser's list of easy link approved publishers.

Figure 3:
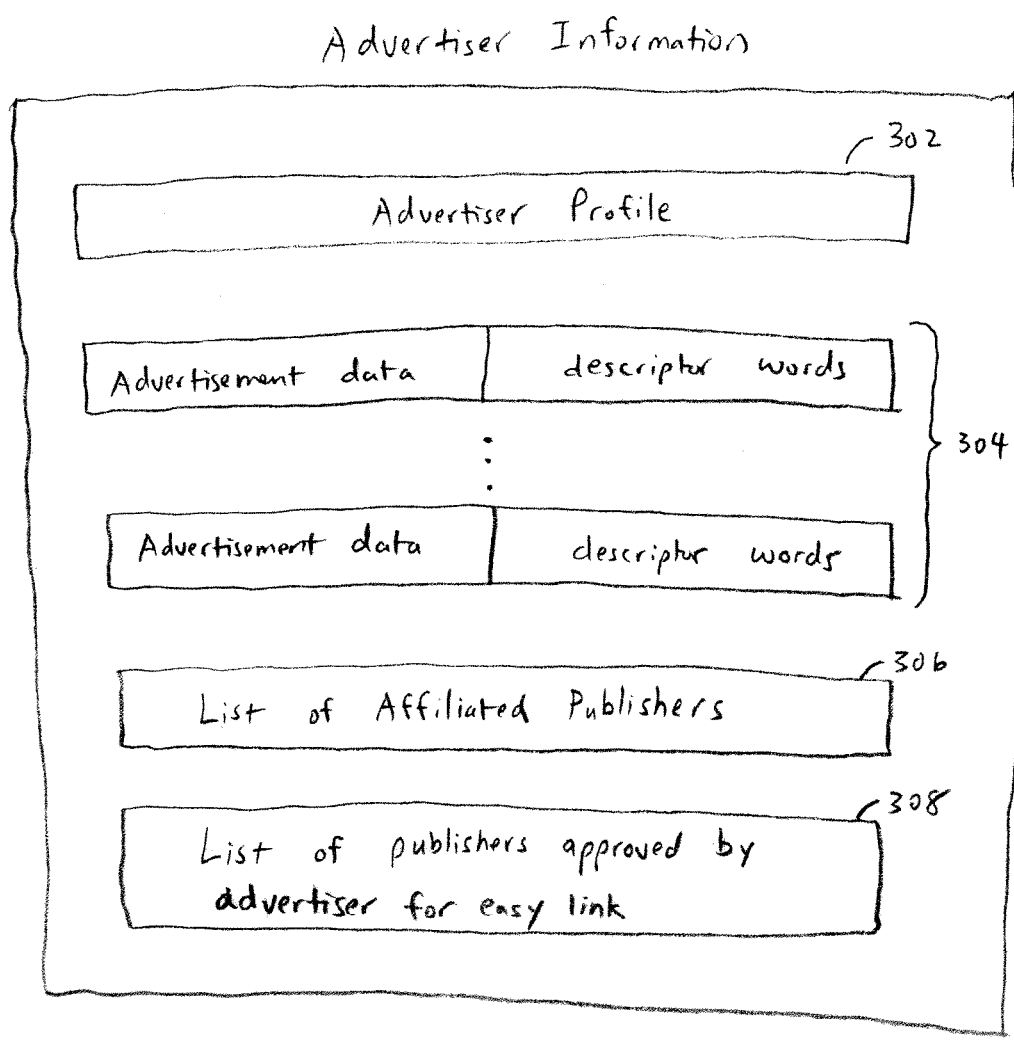
FIG. 3 is a block diagram of exemplary advertiser information that is stored in the storage medium/database of FIG. 2.

FIG. 3 shows a block diagram illustrating an advertiser's information that is stored in the storage medium/database (FIG. 2, 204) of the ad server. As mentioned above, the ad server can store an advertiser profile 302, electronic advertisements with associated descriptor words 304, a list of publishers that are affiliated with the advertiser 306, and a list of easy link approved publishers 308. An advertiser computer can communicate with the ad server to manage this information.

Figure 4:
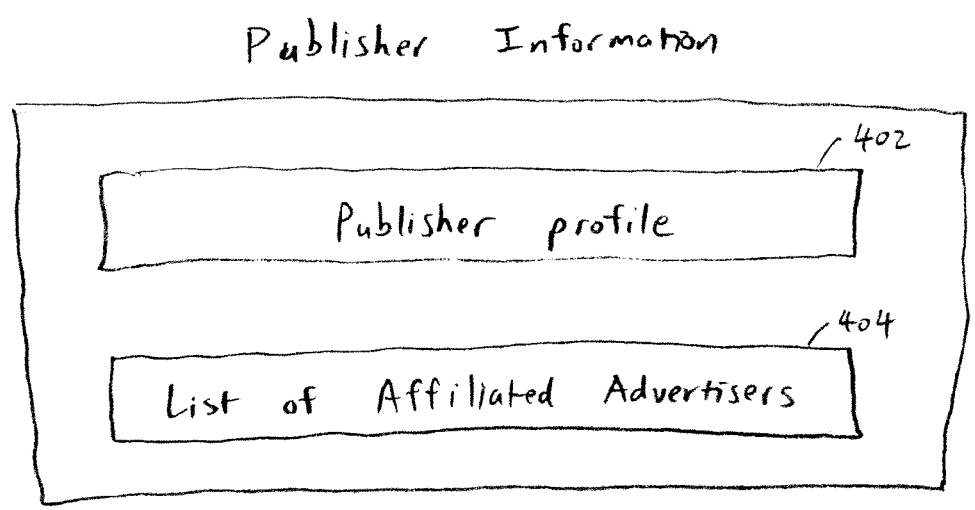
FIG. 4 is a block diagram of exemplary publisher information that is stored in the storage medium/database of FIG. 2.

In one aspect of the disclosed technology, a publisher computer can communicate with the ad server to manage its advertisement services and publisher-advertiser affiliate relationships. In one embodiment, the ad server can maintain a publisher profile for each publisher communicating with it. The publisher profile can include, for example, a publisher's contact information and financial account information. In one embodiment, the ad server can offer different tiers of advertisement services, and the publisher profile can specify which services are enabled or disabled for the publisher. In one embodiment, a publisher profile can indicate whether easy link is enabled or disabled for the publisher. In one embodiment, a list of advertisers affiliated with a publisher can also be stored in the ad server, and a publisher computer can communicate with the ad server to update and manage this list. FIG. 4 shows a block diagram illustrating a publisher's information that is stored in the storage medium/database (FIG. 2, 204) of the ad server. As mentioned above, the ad server can store a publisher profile 402 and a list of advertisers that are affiliated with the publisher 404. A publisher computer can communicate with the ad server to manage this information.

Figure 5:
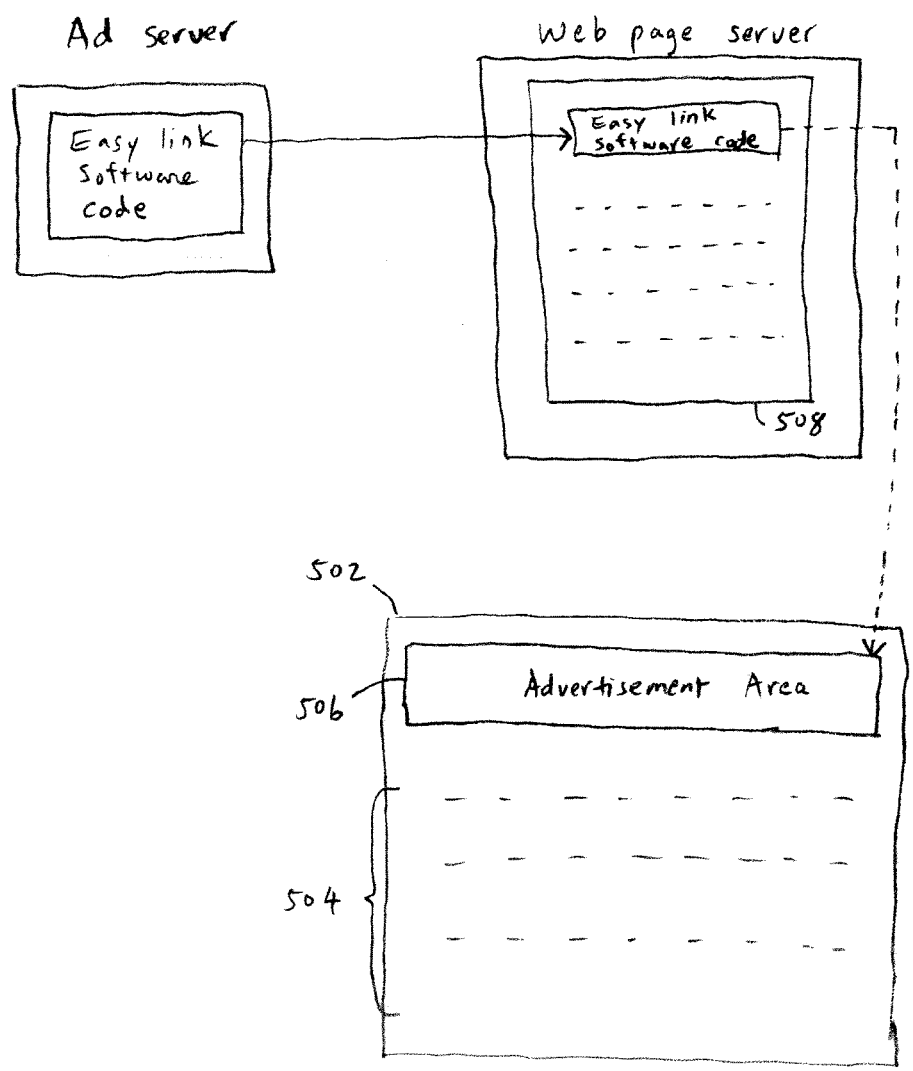
FIG. 5 is a block diagram illustrating an exemplary relationship between easy link software code, Web page source code, and a Web page.

In one aspect of the disclosed technology, a publisher computer can communicate with the ad server to initialize and configure easy links for the publisher's Web pages. As mentioned above, easy link is an advertisement service provided by the ad server. Using easy link, the ad server provides particular electronic advertisements to a Web page based on the content of the Web page. For example, if a Web page describes pet health, then relevant advertisements related to pet health can be provided for display in the Web page, such as advertisements for pet stores or advertisements for pet products. FIG. 5 shows an exemplary Web page 502 and its Web page source code 508 stored on a publisher's Web page server. The illustrated Web page 502 includes an area for displaying an electronic advertisement 506 and other areas that display Web page content 504. In the illustrated example, the easy link service provides one or more electronic advertisements in the advertisement area 506 that are related to the Web page content 504. Those skilled in the art will understand that a "Web page" refers to a collection of different things, including, for example, visual content displayed on a screen (e.g., text, picture, video, buttons, etc.) and software code that perform various functions. At least some of a Web page's software code is located in the Web page's source code 508, which is stored on a Web page server. Web page source code can include hyper-text markup language (HTML), JavaScript, and/or other software languages. In one aspect of the disclosed technology, a publisher initializes easy links for a Web page 502 by inserting easy link software code into the Web page's source code 508, which is stored on the publisher's Web page server. When a user computer requests the Web page source code 508 from the Web page server and loads it into the user computer's Web browser, the easy link software code sets up the advertisement area 506 in the Web page and causes the user computer to request an electronic advertisement from the ad server. Examples of easy link software code will now be described.

In one aspect of the disclosed technology, there are different types of easy link services. In one type of easy link, referred to herein as "single advertiser easy link," the ad server provides to a Web page one or more electronic advertisements from a particular advertiser. One example of software code that can be inserted into Web page source code for single advertiser easy link can be:

```
<script type="text/JavaScript">
    ad_width = 728;
    ad_height = 90;
    ad_type = 'leaderboard';
    publisherID='XXXXXXXXXXX';
    oid=NNNN;
</script>
<script src="http://lsadnetwork.linksynergy.com/lsads.js"
type="text/JavaScript">
</script>
<IMG border="0" width="1" height="1" src="http://ad.linksynergy.com/fs-bin/show?id=XXXXXXXXXXX&bids=11111.11&type=XX">
```

The "ad_width", "ad_height", and "ad_type" parameters define the size and type of the advertisement to be displayed in the Web page. The "publisherID" parameter identifies the publisher of the Web page. In one embodiment, the "oid" parameter identifies the particular advertiser whose advertisements should be used for the Web page. In one embodiment, the "oid" parameter identifies an advertiser as well as a set of advertisements from the advertiser that should be used for the Web page. When a user computer loads the above software code into its Web browser, the software code will execute on the user computer and set up the advertisement area 506, as well as cause the user computer to communicate with the easy link software (FIG. 2, 206) in the ad server to request an electronic advertisement. The user computer will access the "lsads.js" script at the ad server, which is part of the easy link software at the ad server. The easy link software will be described in detail in connection with FIGS. 7-9. The image tag in the software code is a pixel beacon used for tracking easy link requests, which will be described in connection with FIG. 10. For now, it is sufficient to point out that the pixel beacon tracks a publisher identifier ("id"), a publisher-advertiser relationship ("bids"), and the type of easy link ("type"), that is, single advertiser easy link or cross advertiser easy link.

In another type of easy link, referred to herein as "cross advertiser easy link," the ad server provides to a Web page one or more electronic advertisements from any advertiser in a particular group of advertisers. One example of software code that can be inserted into a Web page source code for cross advertiser easy link can be:

```
<script type="text/JavaScript">
    ad_width = 728;
    ad_height = 90;
    ad_type = 'leaderboard';
    publisherID='XXXXXXXXXXX';
</script>
<script
src="http://lsadnetwork.linksynergy.com/lsads.js"
type="text/JavaScript">
</script>
<IMG border="0" width="1" height="1" src="http://ad.linksynergy.com/
fs-bin/show?id=XXXXXXXXXXX&bids=11111.11&type=XX">
```

In this example, the cross advertiser easy link code has no "oid" parameter. In one embodiment, the lack of an "oid" parameter indicates to the ad server that this software code is a cross advertiser easy link. When a user computer loads the above software code into its Web browser, the software code will execute on the user computer and set up the advertisement area 506, as well as cause the user computer to communicate with the easy link software (FIG. 2, 206) in the ad server to request an electronic advertisement. In the absence of the "oid" parameter, the easy link software can access the publisher's information to determine the publisher's affiliated advertisers (FIG. 4, 404), and also access advertiser information to determine whether the publisher is on the advertiser's list of easy link approved publishers (FIG. 3, 308). Based on this information, the easy link software can determine which advertisers' advertisements should be provided to the Web page. The easy link software will be described in more detail in connection with FIGS. 7-9.

Figure 6:
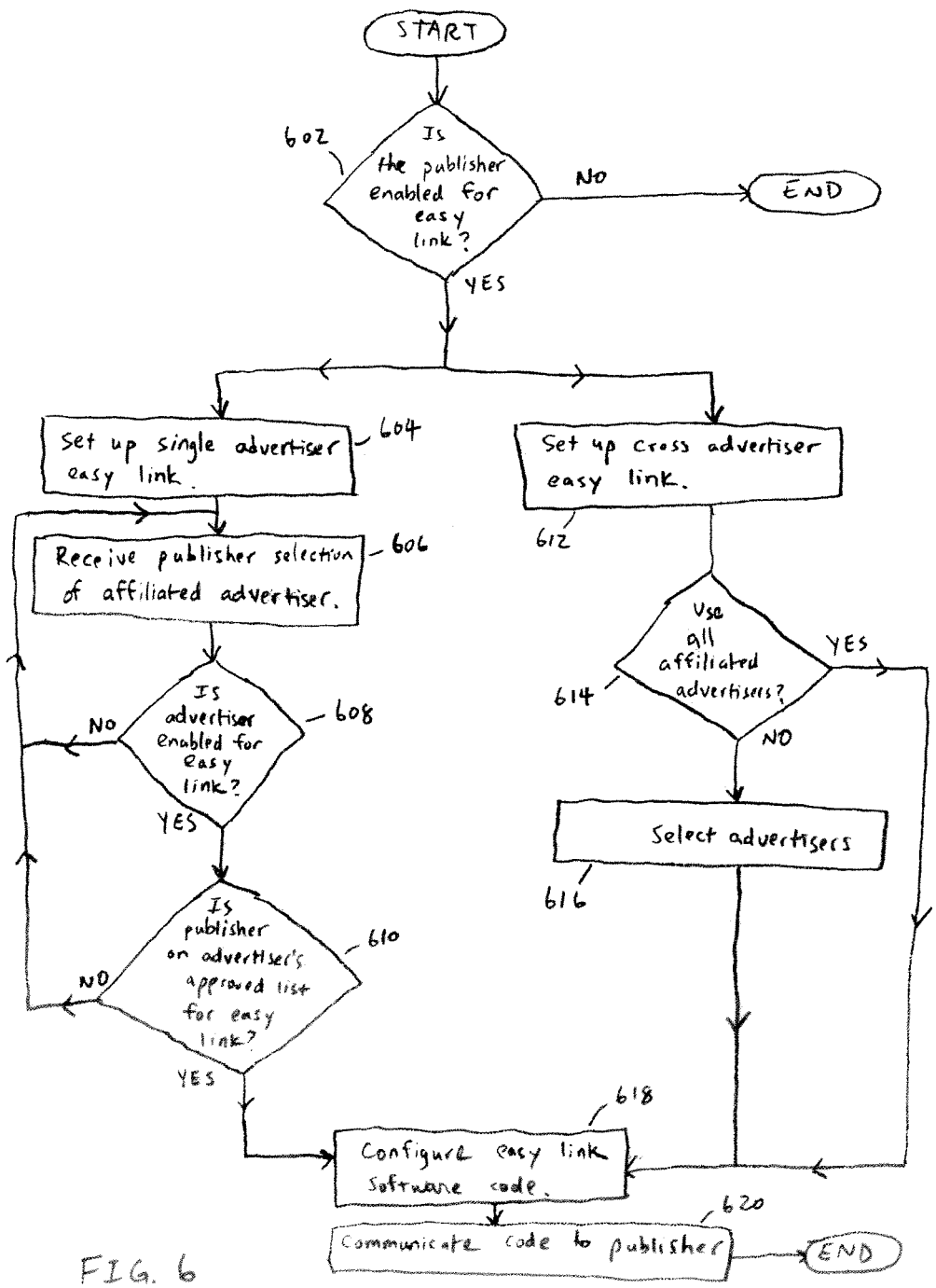
FIG. 6 is a flow chart illustrating exemplary operations of the interface software of FIG. 2 in configuring an easy link.

A publisher can access easy link software code by communicating with the interface software (FIG. 2, 202) of the ad server. FIG. 6 is a flow chart illustrating the interface software's operations. Based on the information in the publisher profile, the interface software can determine whether the publisher is enabled for easy link service (602). If so, a publisher can set up a single advertiser easy link or a cross advertiser easy link. For a single advertiser easy link (604), the publisher can select a particular advertiser affiliate whose advertisements should be provided for the easy link (606). If the selected advertiser is not enabled for easy links, the interface software of the ad server can notify the publisher to select another advertiser (608). If the selected advertiser has not placed the publisher on the advertiser's list of easy link approved publishers, the interface software can notify the publisher to select another advertiser (610). In one embodiment, for a cross advertiser easy link (612), the publisher need not select any advertisers. Rather, the ad server can access the publisher's list of affiliated advertisers to identify advertisers whose advertisements should be used for the cross advertiser easy link (614). In one embodiment, for a cross advertiser easy link, the publisher can be permitted to select particular affiliated advertisers to be associated with the easy link (616), with the ad server interface software checking whether the selected advertisers are enabled for easy links and whether the publisher is on the selected advertisers' list of easy link approved publishers. The ad server can configure the appropriate easy link software code based on the publisher's selections (618) and can communicate the software code to the publisher computer (620). The publisher can then incorporate the easy link software code into Web page source code on the Web page server.

Figure 7:
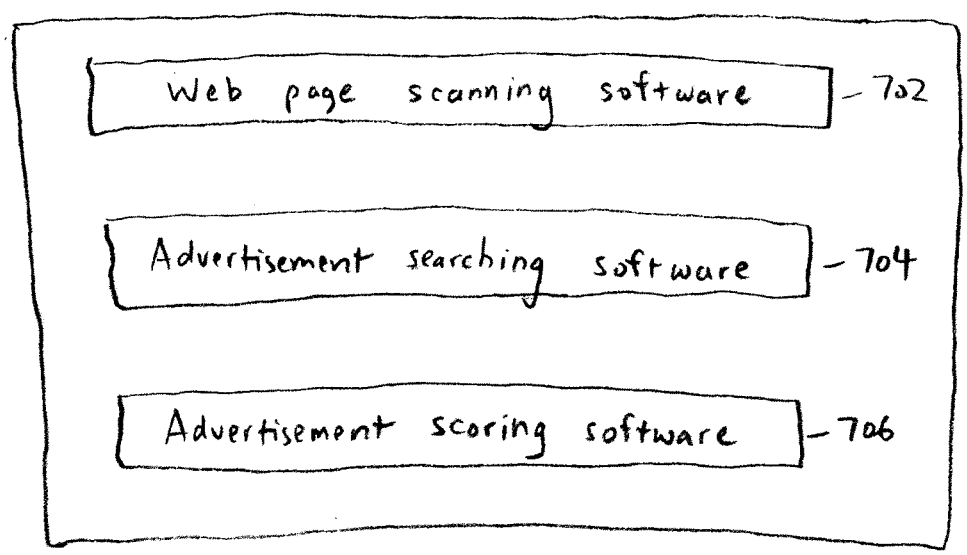
FIG. 7 is a block diagram of exemplary components in the easy link software of FIG. 2.
Figure 8:
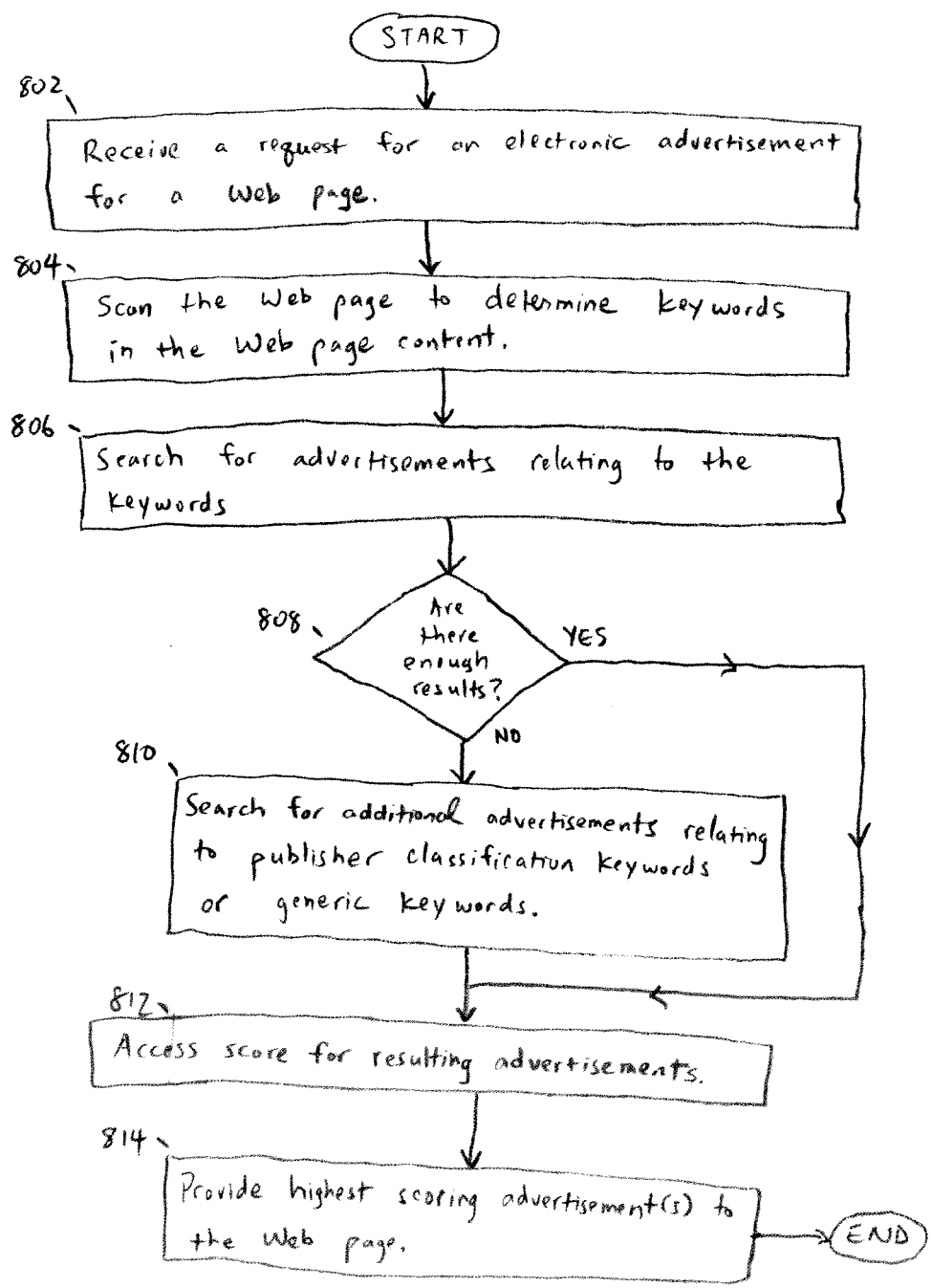
FIG. 8 is a flow chart illustration exemplary operations of the easy link software of FIG. 7.
Figure 9:
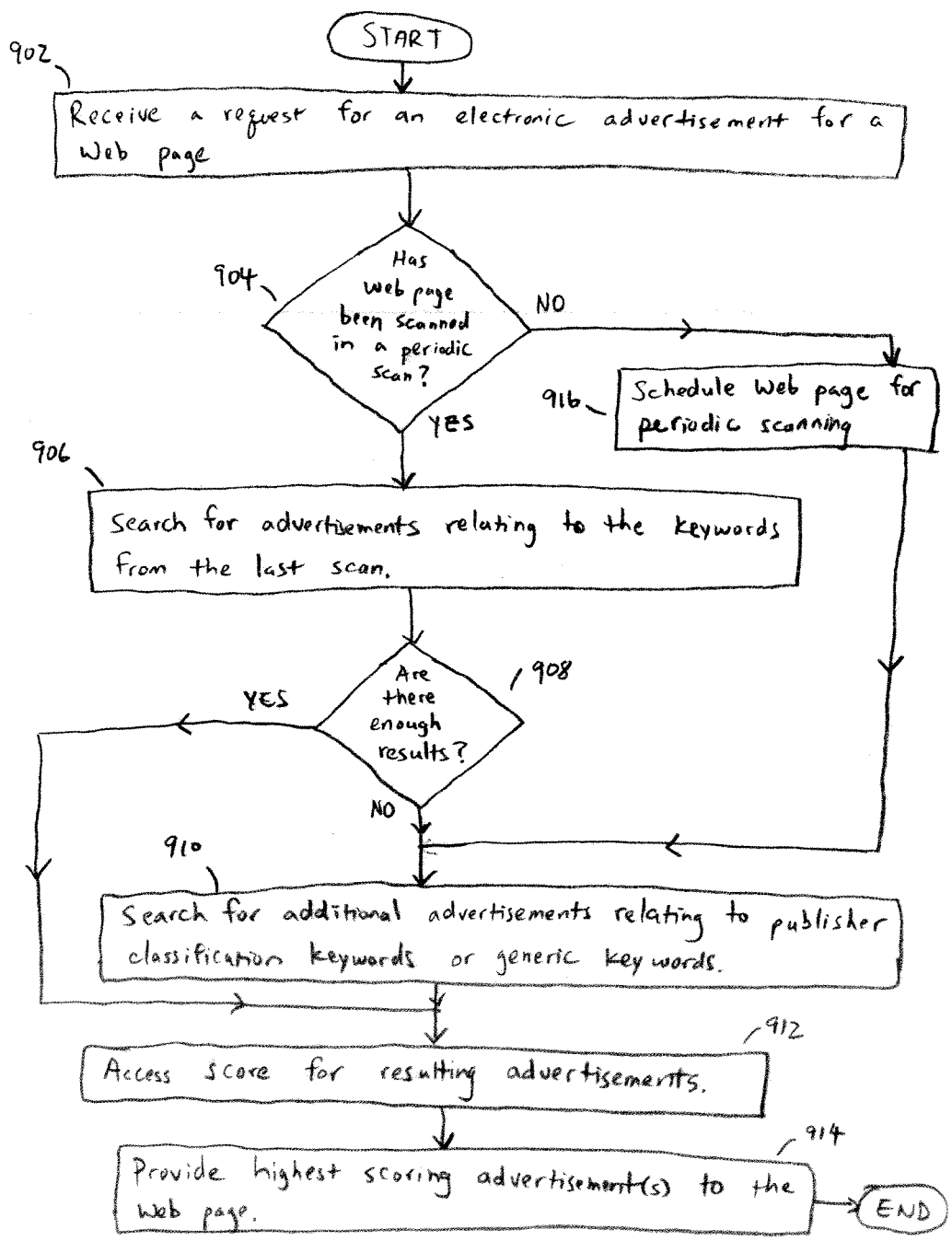
FIG. 9 is a flow chart illustration another exemplary operation of the easy link software of FIG. 7.
Figure 10:
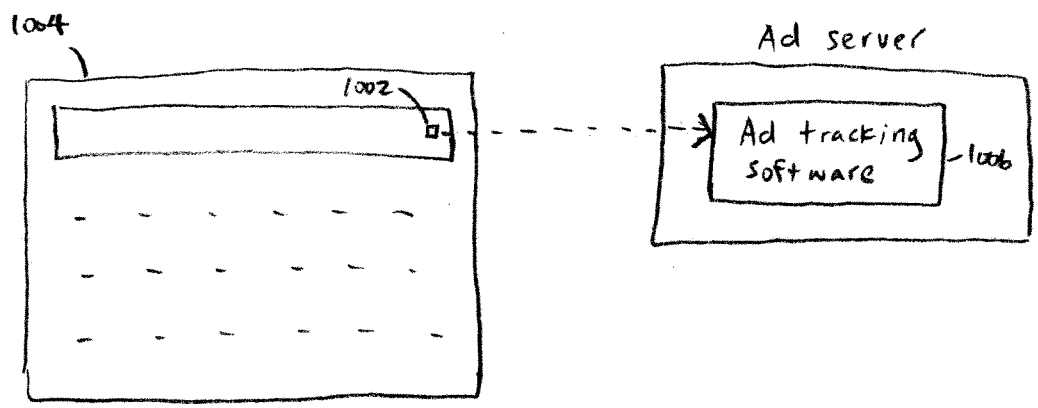
FIG. 10 is a block diagram illustrating an exemplary relationship between a pixel beacon in a Web page and the ad tracking software of FIG. 2.

When a user computer accesses Web page source code from a Web page server and loads the easy link software code into its Web browser, the software code will execute on the user computer and set up an advertisement area (FIG. 5, 506), as well as cause the user computer to communicate with the easy link software (FIG. 2, 206) in the ad server to request an electronic advertisement. Aspects of the easy link software in the ad server will now be described with reference to FIGS. 7-9. FIG. 7 shows an embodiment of the easy link software that includes three software components: Web page scanning software 702, advertisement search software 704, and advertisement scoring software 706. FIG. 8 is a flow chart of an embodiment in which the easy link software scans a Web page's content in response to the Web page being loaded into a user Web browser and a request being made by the user computer for an advertisement. Electronic advertisements are provided to the Web page based on this scan. FIG. 9 is a flow chart of an embodiment in which the easy link software periodically scans a Web page having easy link software code to identify keywords appearing in the Web page content. Electronic advertisements are provided to the Web page based on the latest periodic scan.

The easy link service provides electronic advertisements that relate to the content of a Web page. Referring now to FIG. 7, the easy link software of the ad server can include several components. In the illustrated embodiment, the Web page scanning software 702 scans web pages to identify keywords appearing in the Web page content. In one embodiment, the Web page scanning software 702 uses a technology known in the art as TF-IDF (term frequency-inverse document frequency). Using TF-IDF, the Web page scanning software identifies a list of frequently occurring words in the Web page and compares this to a list of frequently occurring words in a wide array of Web pages. Words that are high in both lists (such as the word "and") are discarded. Words that are high in the Web page list, but are relatively low or not in the collection of Web pages list, are identified as the keywords for the Web page. Use of the TF-IDF technology is exemplary and does not limit the scope of the Web page scanning software 702. Those skilled in the art will recognize that other technologies can also be used by the Web page scanning software 702 to identify keywords in Web page content. For example, technology from Relevad Corporation can be used.

With continuing reference to FIG. 7, the illustrated easy link software also includes advertisement searching software 704. Depending on whether the easy link is a single advertiser easy link or cross advertiser easy link, the advertisement searching software 704 can search advertisements from a particular advertiser or advertisements from multiple advertisers. In one embodiment, the advertisement searching software 704 can search for advertisements that relate to the keyword(s) provided by the Web page scanning software 702. In one embodiment, the search can be performed by comparing the keywords with the descriptor words (FIG. 3, 304) associated with an advertisement. If one or more keywords appear in an advertisement's descriptor words, the advertisement is returned as a search result. In one embodiment, the Web page scanning software 702 may be unable to identify keywords in a Web page for a number of reasons, such as when the Web page contains only Flash animations. In one aspect of the disclosed technology, a publisher profile can contain a publisher classification. Additionally, classification keywords can be assigned by the ad server to each classification. In one embodiment, if the Web page scanning software 702 is unable to identify keywords in a Web page, the advertisement searching software 704 can use classification keywords associated with a Web page publisher's classification to search for advertisements. In one aspect of the disclosed technology, various types of advertisement spaces in a Web page may display multiple advertisements. In one embodiment, a publisher's classification keywords can also be used to search for additional advertisements when a search using keywords from a Web page does not provide enough search results to fill an advertisement space. In one embodiment, if a search using classification keywords still does not provide enough search results to fill an advertisement space, the advertisement searching software 704 can perform a search using generic keywords that are not specific to any Web page or publisher classification. The embodiments described above are exemplary and do not limit the scope of the advertisement search software 704.

Referring again to FIG. 7, the illustrated easy link software also includes advertisement scoring software 706. Various types of scoring technologies can be used by the advertisement scoring software 706, and a few examples are provided below. Depending on the complexity of the scoring technology, scoring of may be performed periodically as a batch process, that is, not specifically in response to a request for advertisements, or scoring may be performed in response to a request for advertisements, that is, scores are computed specifically for advertisements identified by the advertisement searching software 704.

In one aspect of the disclosed technology, the ad server has access to information regarding an advertisement's "performance," which can include measures such as how often or how frequently a click of an advertisement leads to a sale, or how large the sale is in monetary terms once it occurs, or how frequently an advertisement is clicked once it is displayed, or other measures of an advertisement's performance that will be recognized by those skilled in the art. This information can be provided by transaction tracking technology, which is described in U.S. patent application Ser. No. 12/254,809, entitled Methods and Systems for Tracking Electronic Commerce Transactions, which is hereby incorporated herein by reference in its entirety.

One example will now be provided for scoring that can be performed in response to a request for advertisements, that is, scores computed specifically for advertisements identified by the advertisement searching software 704. In one embodiment, the ad server can access information on the number of sales per user click of an advertisement. Because not all user clicks of an advertisement leads to a sale, the sales per click measure will range from zero to one but will most often be less than one. For example, there may be only one sale for every ten user clicks of an advertisement. In one embodiment, the advertisement scoring software 706 can use the sales per click measure for each advertisement as its score. Those skilled in the art will recognize that this scoring technology has relatively low complexity and can be performed in "real-time" on advertisements identified by the advertisement searching software.

One example will now be provided for scoring that can be performed periodically as a batch process, that is, not specifically in response to a request for advertisements. In one embodiment, the advertisement scoring software 706 can use a more sophisticated measure to score advertisements. Specifically, in one aspect of the disclosed technology, each advertisement can be associated with various categories based on aspects of the merchandise or services being advertised, including a price range category (e.g., $10-$20 category), a product classification (e.g., pet nutrition), and a discount category (e.g., 10% discount). In one embodiment, an average sales per click measure can be computed for each category based on sales per click for all advertisements associated with the category. In one embodiment, not all but only some of the advertisements associated with the category are used to compute the average sales per click. In one embodiment, only advertisements from the same advertiser that are in the same category are used to compute the average sales per click ("aspc") for the category. Then, the following is computed for each advertisement:

$$\sqrt[3]{aspc \text{ for price range category} \times aspc \text{ for product classification} \times aspc \text{ for discount category}}$$

In one embodiment, this measure for each advertisement can be normalized to one, that is, each one of these values can be divided by the largest among them so that the resulting measures range from zero to one. This resulting normalized measure can be used as the score for each advertisement. Because this scoring technology has relatively high complexity, the computations are performed as a batch process, and the scores are saved in a storage medium/database, where they can be retrieved as needed. In one embodiment, the batch process is performed once per day for each advertisement in ad server.

Figure 11:
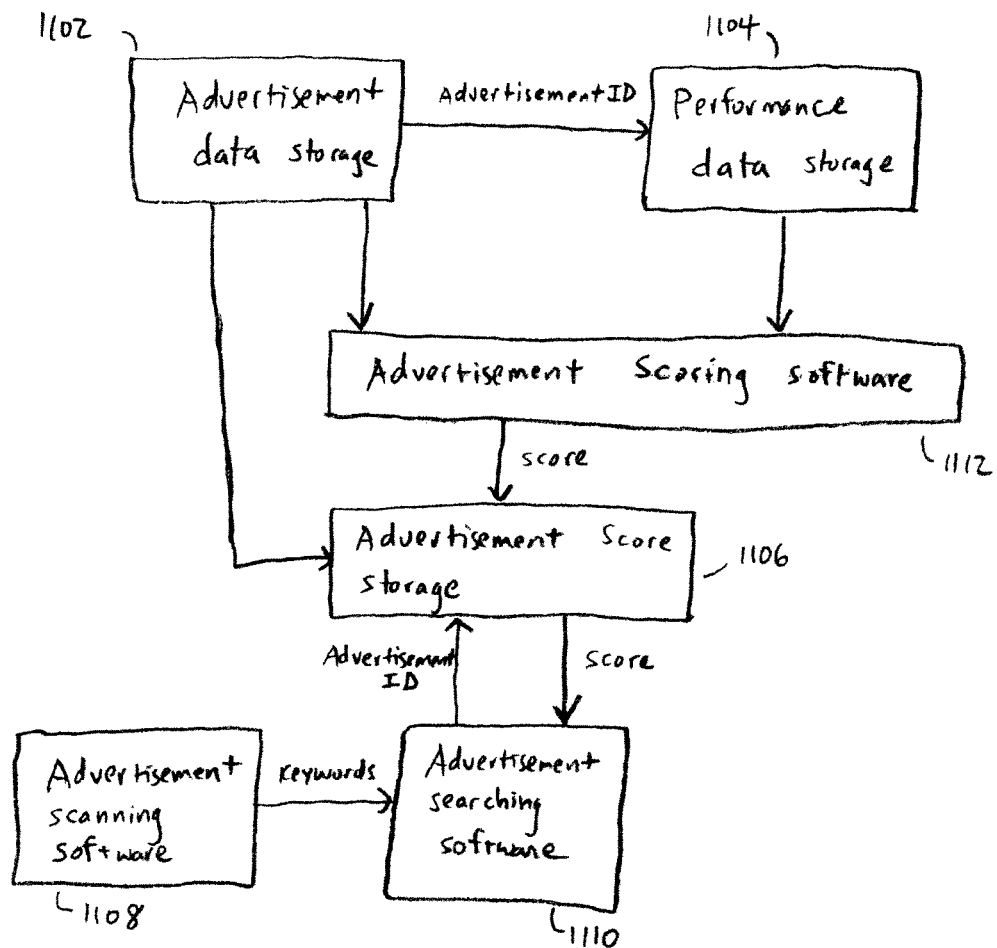
FIG. 11 is a block diagram illustrating exemplary components of batch process embodiment of the advertisement scoring software of FIG. 7.

Referring briefly to FIG. 11, there is shown an exemplary embodiment of components in an advertisement scoring batch process. Advertisement data 1102 includes information such as advertisement ID and the categories associated with the advertisement, such as a price range category, a product classification, and a discount category. The performance data 1104 includes information on the performance of each advertisement, such as sales per click. The advertisement data and the performance data are used to compute a score for each advertisement 1112, using, for example, the scoring technology described above, and the scores can be stored in a storage medium/database 1106 together with advertisement IDs, After the Web page scanning software identifies keywords for a Web page 1108, and the advertisement searching software identifies advertisements 1110, the scores for the identified advertisements can be retrieved from the storage medium/database 1106.

Returning now to FIG. 7, in one aspect of the disclosed technology, after the advertisement searching software 704 identifies advertisement search results, scores for the resulting advertisements are either computed in "real time" or retrieved from a storage medium, as described above. For a single advertiser easy link, the advertisement having the highest score is provided to the Web page. If two or more advertisements have the highest score, then one is chosen at random to provide to the Web page. For a cross advertiser easy link, or for a single advertiser easy link requesting more than one advertisement, the required number of advertisements having the highest scores are provided to the Web page. In one embodiment, for a cross advertiser easy link, the highest scoring advertisement for each advertiser is chosen, and a random one of those is provided to the Web page.

Referring again to the exemplary easy link software code provided above herein and shown below for convenience, the JavaScript file "lsads.js" is located on the ad server and is part of the easy link software. In one embodiment, the "lsads.js" file may include all of the software components shown in FIG. 7. In one embodiment, "lsads.js" may include some of the components and make calls to the other components. In one embodiment, "lsads.js" may include none of the components and make calls to all of the components.

```
<script type="text/JavaScript">
    ad_width = 728;
    ad_height = 90;
    ad_type = 'leaderboard';
    publisherID='XXXXXXXXXXXX';
</script>
<script
src="http://lsadnetwork.linksynergy.com/lsads.js"
type="text/JavaScript">
</script>
<IMG border="0" width="1" height="1" src="http://ad.linksynergy.com/
fs-bin/show?id=XXXXXXXXXXXX&bids=11111.11&type=XX">
```

Referring now to FIG. 8, there is shown a flow chart of one embodiment of easy link software operations. The easy link software can receive a request for an electronic advertisement for a Web page (802). In response to the request, the Web page scanning software can scan the Web page to determine keywords in the Web page content (804). Using these keywords (if any), the advertisement searching software can search for advertisements relating to these keywords (806). If there are not enough search results (808), the advertisement searching software can search for additional advertisements using publisher classification keywords and/or generic keywords (810). The advertisement searching software can access a score for each resulting advertisement (812) and provide one or more highest scoring advertisements to the Web page (814).

FIG. 9 shows a flow chart of another embodiment of easy link software operations in which the Web page scanning software periodically scans Web pages to identify keywords and stores the keywords in a storage medium/database. The easy link software can receive a request for an electronic advertisement for a Web page (902). If the Web page has already been scanned by the Web page scanning software as part of periodic scanning (904), then the advertisement searching software can search for advertisements relating to the stored keywords (906). If there are not enough search results (908), the advertisement searching software can search for additional advertisements using publisher classification keywords and/or generic keywords (910). The advertisement scoring software can assign a score to each resulting advertisement (912) and provide one or more highest scoring advertisements to the Web page (914). On the other hand, if the Web page has not yet been scanned as part of periodic scanning, then the Web page scanning software can schedule the Web page for periodic scanning (916). Then, for the time being, the advertisement searching software can search for advertisements using publisher classification keywords and/or generic keywords (910). The advertisement searching software can access a score for each resulting advertisement (912) and provide one or more highest scoring advertisements to the Web page (914). The embodiments illustrated in FIGS. 8 and 9 are exemplary and do not limit the scope of the easy link software.

What have been described thus far are systems, architectures, and methods for providing to a Web page one or more advertisements that relate to the contents of the Web page. The following will now describe tracking of ad impressions with reference to FIG. 10.

In one aspect of the disclosed technology, tracking of ad impressions can be accomplished a "pixel beacon," 1002 which is a 1×1 pixel "image" in a Web page 1004 that is hyperlinked to ad tracking software 1006 in the ad server. Because the image is only a single pixel, it is essentially imperceptible to the user. Those skilled in the art will recognize that a URL (universal resource locator) can have an "electronic address" portion and a "data field" portion. The pixel beacon hyperlink can contain a URL in which the electronic address portion points to the ad tracking software 1006 in the ad server and in which the data field portion includes the information to be reported. The following one example of a pixel beacon:

```
<IMG border="0" width="1" height="1"
src="http://ad.linksynergy.com/fs-bin/show?id=XXXXXXXXXXXX&bids=
11111.11&type=XX">
```

In this example, the electronic address portion of the URL is "http://ad.linksynergy.com/fs-bin/show" (the ad tracking software in the ad server) and the data field portion is everything after the "?" symbol. In the example, the pixel beacon 1002 reports a publisher identifier ("id"), a publisher-advertiser relationship ("bids"), and the type of easy link ("type"), that is, single advertiser easy link or cross advertiser easy link. The ad tracking software 1006 can retrieve the reported information from the data field portion of the URL and can store the retrieved information in a storage medium/database. One skilled in the art will understand how to implement a pixel beacon, and will understand that the ad impression reporting will occur as the pixel beacon hyperlink is being loaded into a user Web browser 1004.

In one embodiment, a pixel beacon can be located in the easy link software code incorporated into a Web page source code. In one embodiment, a pixel beacon can be placed in the "lsads.js" file. In one embodiment, a pixel beacon can be placed in each advertisement, so that individual advertisement impressions can be tracked. In one embodiment, if a Web page advertisement area uses iFrames, a pixel beacon can be placed in the advertisement area but outside the iFrames.

Various embodiments of the disclosed technology have been described herein for providing to a Web page electronic advertisements related to the content of the Web page. Various embodiments are described below. The embodiments should not be considered to be mutually exclusive. It is contemplated that various embodiments can be combined.

In one aspect of the disclosed technology, a computer-implemented method in accordance with the disclosed technology receives a request for an electronic advertisement for a Web page, wherein the Web page is associated with a Web page publisher, accesses one or more keywords appearing in the Web page, identifies one or more relevant electronic advertisements related to the keyword(s), wherein the relevant electronic advertisement(s) are associated with an advertiser affiliated with the Web page publisher, and communicates one or more the relevant electronic advertisements to the Web page for display. In one embodiment, the one or more relevant electronic advertisements include products related to the keyword(s) and include a product image and a product price which are provided to the Web page for display.

In one embodiment, the computer-implemented method further accesses the Web page and scans the Web page to identify one or more keywords appearing in said Web page. This scanning is performed in response to receiving the request for an electronic advertisement for the Web page.

In one embodiment, the computer-implemented method further accesses the Web page and scans the Web page periodically to identify one or more keywords appearing in the Web page. At least one periodic scan occurs before the request for an electronic advertisement for the Web page is received.

In one embodiment, the computer-implemented method receives a request for an electronic advertisement associated with a particular advertiser. The computer-implemented method further searches a database of electronic advertisements based on the keyword(s) and the particular advertiser, provides search results that include two or more identified electronic advertisements associated with the particular advertiser, accesses a score for each of the identified electronic advertisements, and provides at least the highest scoring electronic advertisement to the Web page.

In one embodiment, the computer-implemented method receives a request for an electronic advertisement associated with any advertiser from a particular group of advertisers. The computer-implemented method further searches a database of electronic advertisements based on the keyword(s) and the particular group of advertisers, provides search results that include two or more identified electronic advertisements associated with any advertiser from the particular group of advertisers, accesses a score for each of the identified electronic advertisements, and provides at least the highest scoring electronic advertisement to the Web page.

In one aspect of the disclosed technology, the disclosed technology also includes a computer executing software, wherein the executed software causes the computer to perform one or more of the embodiments above.

Embodiments of the present invention comprise software and computer components and software and computer-implemented steps that will be apparent to those skilled in the art. For example, requesting, serving, tracking, storing, and communicating can be performed electronically.

For ease of exposition, not every step or element of the present invention is described herein as part of software or computer system, but those skilled in the art will recognize that each step or element may have a corresponding computer system or software component. Such computer system and/or software components are therefore enabled by describing their corresponding steps or elements (that is, their functionality), and are within the scope of the present invention.

It will be appreciated that the present invention has been described by way of example only, and that the invention is not to be limited by the specific embodiments described herein. Improvements and modifications may be made to the invention without departing from the scope or spirit thereof.

What is claimed is:

1. A computer-implemented method for managing and serving electronic advertisements for affiliated publishers and advertisers via a graphical user interface in a web browser, the method comprising:

maintaining, by a non-transitory storage medium of an advertisement server, advertiser information for a plurality of advertisers, the advertiser information for each advertiser including at least one electronic advertisement provided by the advertiser, a list of publishers approved by the advertiser, and whether each advertiser is enabled or disabled for easy link, wherein each publisher publishes at least one graphical user interface in a web browser, and wherein easy link allows the advertisement server to provide an advertisement of the advertiser to the graphical user interface of the publisher based on content of the graphical user interface;
   maintaining, by the storage medium of the advertisement server, publisher information for a plurality of publishers, the publisher information for each publisher including a list of advertisers affiliated with the publisher and whether each publisher is enabled or disabled for easy link;
   receiving, by a processor of the advertisement server, a first request from a publisher computer for easy link software code to be placed in a graphical user interface;
   responding, by the processor of the advertisement server, the first request from the publisher computer for the easy link software code to be placed in the graphical user interface by:
      (1) accessing, by the processor, the publisher information to determine whether the publisher is enabled or disabled with easy link;
      (2) providing no easy link software code to the first request when the publisher is disabled with easy link; and
      (3) executing the following when the publisher is enabled with easy link:
         (a) receiving a selection of advertisers from the publisher computer;
         (b) for each selected advertiser, determining if the publisher is on the list of publishers approved by the selected advertiser, responding to the publisher computer to choose a different advertiser when the publisher is not on the list of publishers approved by the selected advertiser,
         and determining whether the selected advertiser is enabled or disabled for easy link, responding to the publisher computer to choose a different advertiser when the selected advertiser is disabled for easy link;
         (c) configuring the easy link software code based on the selected advertisers, when the publisher is on the list of publishers approved by the selected advertisers, and when the selected advertisers are enabled for easy link; and
         (d) sending the configured easy link software code to the publisher computer for incorporation into the publisher's graphical user interface;
   receiving a second request, from a user computer, for an electronic advertisement to be displayed in the graphical user interface, when the easy link software code is executed on the user computer during loading of the publisher's graphical user interface in the web browser of the user computer; and
   responding, by the processor of the advertisement server, the second request from the user computer by:
      (1) determining a keyword associated with content of the graphical user interface;
      (2) identifying advertisements provided by at least one advertiser affiliated with the publisher of the graphical user interface, where the at least one advertiser has the publisher of the graphical user interface on the list of publishers approved by the advertiser;
      (3) determining whether each identified advertisement relates to the keyword associated with the content of the graphical user interface;
      (4) for identified advertisements that relate to the keyword associated with the content of the graphical user interface, determining a score for each identified advertisement based on its performance;
      (5) ranking the identified advertisements based on the scores; and
      (6) outputting for display at least the highest scoring identified advertisement in the graphical user interface in the user computer's web browser.

2. The computer-implemented method as in claim 1, wherein:
the processor communicates a product image and a product price for at least the highest scoring identified advertisement to the graphical user interface for display.

3. A computer-implemented method as in claim 1, further comprising:
scanning graphical user interfaces of the plurality of publishers periodically to identify at least one keyword appearing in each graphical user interface, wherein at least one periodic scan occurred before receiving a request for an electronic advertisement for the graphical user interface.

4. The computer-implemented method as in claim 1, wherein the request for the electronic advertisement, received by the processor, includes a request for an electronic advertisement associated with a particular advertiser.

5. The computer-implemented method as in claim 1, further comprising receiving a pixel beacon that identifies a publisher identifier and a publisher-advertiser relationship to track each request for an electronic advertisement.

6. The computer-implemented method as in claim 1, wherein the request for the electronic advertisement, received by the processor, includes a request for an electronic advertisement associated with any advertiser from a particular group of advertisers.

7. The computer-implemented method as in claim 5, further comprising tracking advertisement impression by tracking information received from the pixel beacon.

8. The computer-implemented method as in claim 1, wherein the score for each advertisement is based on one or more characteristics of a product or service associated with the advertisement, and said one or more characteristics of product or service associated with said advertisement are selected from the group consisting of: a price range category, a product classification, and a discount category.

9. The computer-implemented method as in claim 8, wherein said score is determined by the following formula:

$$\sqrt[3]{\frac{\text{average sales}}{\text{per click for}} \times \frac{\text{average sales}}{\text{per click for}} \times \frac{\text{average sales}}{\text{per click for}}}$$
$$\text{price range category} \quad \text{product clissification} \quad \text{discount category}$$

10. A system for managing and serving electronic advertisements for affiliated publishers and advertisers via a graphical user interface in a web browser, comprising:
a publisher computer of a publisher for publishing a graphical user interface in a web browser;
a user computer for loading the graphical user interface in the web browser; and
an advertisement server coupled to the publisher computer via a network including:
a non-transitory storage medium maintaining:
advertiser information for a plurality of advertisers, the advertiser information for each advertiser including at least one electronic advertisement provided by the advertiser, a list of publishers approved by the advertiser, and whether each advertiser is enabled or disabled for easy link, wherein each publisher publishes at least one graphical user interface, and wherein easy link allows the advertisement server to provide an advertisement of the advertiser to the graphical user interface of the publisher based on content of the graphical user interface;
publisher information for a plurality of publishers, the publisher information for each publisher including a list of advertisers affiliated with the publisher, the publisher information including whether each publisher is enabled or disabled for easy link; and
a processor in communication with the non-transitory storage medium, the processor configured to:
receive a first request from the publisher computer for easy link software code to be placed in the graphical user interrace, the easy link software code executable on the user computer when the graphical user interface is loaded in the web browser to request an electronic advertisement from the advertisement server;
respond the first request from the publisher computer for the easy link software code by:
(1) accessing the publisher information to determine whether the publisher is enabled or disabled with easy link;
(2) providing no easy link software code to the first request when the publisher is disabled with easy link; and
(3) executing the following when the publisher is enabled with easy link:
(a) receiving a selection of advertisers from the publisher computer;
(b) for each selected advertiser, determining if the publisher is on the list of publishers approved by the selected advertiser, responding to the publisher computer to choose a different advertiser when the publisher is not on the list of publishers approved by the selected advertiser,
and determining whether the selected advertiser is enabled or disabled for easy link, responding to the publisher computer to choose a different advertiser when the selected advertiser is disabled for easy link;
(c) configuring the easy link software code based on the selected advertisers, when the publisher is on the list of publishers approved by the selected advertisers, and when the selected advertisers are enabled for easy link; and
(d) sending the configured easy link software code to the publisher computer for incorporation into the graphical user interface;
receive a second request from the user computer for an electronic advertisement to be displayed in the graphical user interface, when the easy link software code is executed on the user computer during loading of the graphical user interface in the web browser;
respond the second request from the user computer by:
(1) determining a keyword associated with content of the graphical user interface;
(2) identifying advertisements provided by at least one advertiser affiliated with the publisher of the graphical user interface, where the at least one advertiser has the publisher of the graphical user interface on the list of publishers approved by the advertiser;

(3) determining whether each identified advertisement relates to the keyword associated with the content of the graphical user interface;
(4) for identified advertisements that relate to the keyword associated with the content of the graphical user interface, determining a score for each identified advertisement based on its performance;
(5) ranking the identified advertisements based on the scores; and
(6) outputting for display at least the highest scoring identified advertisement in the graphical user interface in the user computer's web browser.

11. The system as in claim 10, wherein the processor communicates a product image and a product price for at least the highest scoring identified advertisement to the graphical user interface for display.

12. The system as in claim 10, wherein
the processor scans graphical user interfaces of the plurality of publishers periodically to identify at least one keyword appearing in each graphical user interface, wherein at least one periodic scan occurred before receiving a request for an electronic advertisement for the graphical user interface.

13. The system as in claim 10, wherein the request for the electronic advertisement, received by the processor, includes a request for an electronic advertisement associated with a particular advertiser.

14. The system as in claim 10, wherein the processor receives a pixel beacon that identifies a publisher identifier and a publisher-advertiser relationship to track each request for an electronic advertisement.

15. The system as in claim 10, wherein the request for the electronic advertisement, received by the processor, includes a request for an electronic advertisement associated with any advertiser from a particular group of advertisers.

16. The system as in claim 14, wherein the processor tracks advertisement impression by tracking information received from the pixel beacon.

17. The system as in claim 10, wherein the score for each advertisement is based on one or more characteristics of a product or service associated with the advertisement, and said one or more characteristics of product or service associated with said advertisement are selected from the group consisting of: a price range category, a product classification, and a discount category; and wherein said score is determined by the following formula:

$$3\sqrt{\frac{\text{average sales per click for price range category} \times \text{average sales per click for product clissification} \times \text{average sales per click for discount category}}{}}.$$

* * * * *